3,450,767
PROCESS FOR PRODUCING PURE
HEXAMETHYLENEDIAMINE
Norbert F. Cywinski, Odessa, Tex., assignor to El Paso
Products Company, Odessa, Tex., a corporation of
Texas
No Drawing. Filed Sept. 13, 1966, Ser. No. 578,970
Int. Cl. C07d *31/04;* C07c *87/14, 85/04*
U.S. Cl. 260—585                                    6 Claims

ABSTRACT OF THE DISCLOSURE

Process for producing pure hexamethylenediamine by reacting a mixture comprising 1,6-dihalohexane, 1,4-dihalohexane, 1,5-dihalohexane and 2,5-dihalohexane with ammonia to form hexamethylenediamine from the 1,6-dihalohexane and lower boiling cyclic amines from the remaining halogenated hexanes and separating the products produced.

---

This invention relates to the synthesis of aminated hydrocarbons and, more particularly, to an improved process for producing hexamethylenediamine in pure form by removal of the impurities therefrom.

It is known that aliphatic diamines can be produced from diolefins by various means, including a procedure involving hydrohalogenation of the diolefin to produce the dihalogenated derivative with subsequent ammonolysis to prepare the diamines. In a specific application of such a process, 1,5-hexadiene is subjected to anti-Markownikoff hydrobromination to produce 1,6-dibromohexane with subsequent direct ammonolysis to prepare hexamethylenediamine, a basic diamine intermediate useful for the production of several commercial grades of nylon.

In actual practice, this hydrobromination procedure produces a mixture of brominated products, including 1,4-dibromohexane, 1,5-dibromohexane and the desired 1,6-dibromohexane, as well as minor amounts of monobrominated derivatives. Heretofore, it has been necessary to effect a separation of the dibrominated isomers prior to the ammonolysis step in order to aminate only the 1,6-dibromohexane and thereby avoid the obtention of final product mixtures. In the case of hexamethylenediamine production, these isomeric mixtures are extremely difficult to separate satisfactorily as the boiling points of the dibrominated materials are of close promixity.

In these prior procedures, therefore, the above-identified two-step process has been less than satisfactory for commercial large-scale operations as the mixtures produced have dictated that yields of the desired product will be insufficient to be economically useful. Moreover, these prior processes have presented unusually difficult product recovery and isolation problems.

It is accordingly one object of the present invention to provide an improved process for the production of substantially pure aliphatic diamines.

A further object of the invention resides in the provision of an improved process for producing an aliphatic diamine free from isomeric amine contamination.

A still further object of the present invention resides in the provision of an improved process for the direct ammonolysis of a mixture of dibrominated hexanes to selectively produce hexamethylenediamine in good yield with ease of product separation and isolation.

Other objects and advantages of the invention will become apparent as the description of the invention proceeds.

In accordance with the present invention and in satisfaction of the above objects and advantages, there is provided by this invention an improved process for preparing substantially pure hexamethylenediamine which comprises subjecting a mixture of dihalohexanes to direct ammonolysis without a prior isomer separation step to form hexamethylenediamine which may be easily separated from the other amine products formed.

It has now been discovered that the dihalogenated mixtures obtained as a result of the anti-Markownikoff hydrohalogenation of 1,5-hexadiene may be subjected to direct ammonolysis to product the desired hexamethylenediamine without previously separating the dihalogenated mixtures. In accordance with this invention, it has been surprisingly discovered that, on direct ammonolysis, the undesired dihalohexane isomers react with the ammonia to form cyclic amines with great selectivity. These cyclic amines are then easily separated from the desired hexamethylenediamine by reason of their substantially lower boiling points.

The process of this invention has been found to be particularly applicable to the preparation of hexamethylenediamine by the hydrobromination of 1,5-hexadiene and, therefore, the process will be particularly described with respect to this embodiment. However, it is to be understood that the process is to be considered of general application in such amination reactions.

One method for hydrobrominating 1,5-hexadiene comprises passing a large stoichiometric excess of gaseous hydrogen bromide through liquid 1,5-hexadiene in the presence of a reaction initiator at about ambient temperature. The use of the reaction initiator serves to cause the reaction to proceed in a manner contrary to the well-known Markownikoff rule and thus produce a predominant amount of desired 1,6-dibromohexane. This reaction, however, has also been found to produce substantial interfering amounts of other dibromohexane isomers including 1,4-dibromohexane, 1,5-dibromohexane, and 2,5-dibromohexane as well as various monobrominated products.

Heretofore, it has been necessary to resort to difficult separation techniques in order to isolate the desired 1,6-dibromohexane from the other isomers produced and identified above in order to obtain substantially pure hexamethylenediamine on subsequent ammonolysis. The separation of these dibromohexane isomeric products is extremely difficult as these products are thermally unstable and have boiling points lying in close proximity to the desired 1,6-dibromohexane. Hence, their separation by means of fractional distillation, for example, is practically impossible to effect.

According to the procedure of this invention, the separation of the several dibromo-isomers is entirely avoided by subjecting the entire mixture directly to reaction with ammonia. During the ammonolysis process, the 1,4-dibromohexane, 1,5-dibromohexane, and 2,5-dibromohexane react with the ammonia to form the cyclic amines, 2-ethylpyrrolidine, 2-pipecoline, and 2,5-dimethylpyrrolidine, respectively, wilth selectivity of 90 to 100 percent, whereas, the 1,6-dibromohexane present in the mixture reacts with ammonia to form the desired hexamethylenediamine. In particular, it has been found that, under amination conditions, the 1,5-dibromohexane present in the mixture cyclizes to produce 2-pipecoline (2-methylpiperidine) as the sole product and 2,5-dibromohexane yields 99 percent of the cyclic product 2,5-dimethylpyrollidine.

It has been found that these above-identified cyclic amines boil substantially lower than the desired hexamethylenediamine and thus the separation and isolation thereof can be effected without difficulty by the use of conventional fractional distillation or steam distillation.

In one embodiment, this ammonolysis process involves reacting the mixture of dibrominated products directly with a large excess of liquid anhydrous ammonia at temperatures of about ambient and pressures of about atmospheric to about 1000 p.s.i.g., preferably 50 to 300 p.s.i.g. However, the ammonolysis reaction may be carried out under other conditions known to the art, such as the use of aqueous ammonia solution. Therefore, the novel process of the invention is not to be considered as limited to any specific process for effecting the ammonolysis.

An additional benefit gained unexpectedly from the process of the invention is that the recovery of the bromine from the undesired dibromohexanes is also facilitated. It has been found that the bromine, which is present as the hydrobromide salt of the cyclic amines, may be recovered by treating the amines with a base to free the amines and form a metal bromide from which the bromine may be recovered by conventional means.

The following examples represent specific embodiments of the present invention.

EXAMPLE I

Production of dibromohexane mixture

The reactor employed in this example comprised a coiled glass tube having an inside diameter of 6 mm. and a volume of 30 cc. The coil was enclosed in a glass jacket which served to control the reaction temperature by means of cooling water. The temperature of the cooling water was maintained at about 30° C.

1,5-hexadiene was pumped at a rate of 0.244 gram mole per hour and admixed with 0.118 gram mole per hour of oxygen. This stream was then admixed with 0.608 gram mole per hour of gaseous hydrogen bromide and passed through the reactor.

At the conclusion of the reaction, the reactor effluent was trapped in an ice-cooled receiver and a sample thereof analyzed by gas chromatography. The analytical results are as shown below in Table I.

TABLE I

| Product: | Weight percent |
|---|---|
| Light ends (L.E.) | 0.9 |
| 5-bromohexene-1 | 0.5 |
| 6-bromohexene-1 | 1.7 |
| Other dibromides | 0.1 |
| 2,5-dibromohexane | 0.8 |
| 1,4-dibromohexane | 2.3 |
| 1,5-dibromohexane | 5.6 |
| 1,6-dibromohexane | 85.6 |
| Heavier | 2.5 |

The mixture resulting from the above hydrobromination reaction was subjected to distillation to remove the light ends and mono-brominated products and the dibromide mixture forwarded directly for amination.

EXAMPLE II

Amination of dibromides

The reactor employed in this example comprised a 1-liter stainless steel autoclave with agitation provided by a Magnedash stirrer.

19.4 gram moles of anhydrous liquid ammonia were charged to the autoclave and stirring commenced. Then, 0.065 gram moles of the dibromide mixture obtained from Example I was added over a period of about 25 minutes. Thereafter, the reaction mixture was agitated by stirring for four hours at a temperature of about 30° C. and a pressure of about 200 p.s.i.g. The starting material amounts added represented a ratio of 300 moles of ammonia to 1 mole of 1,6-dibromohexane.

On concluding the reaction, the contents of the reactor were discharged into a flask containing 100 ml. of methanol and the excess ammonia allowed to weather off. The residue was then treated with 16 grams of sodium methoxide dissolved in 60 ml. of methyl alcohol. The resulting mixture was sampled and analyzed employing gas chromatography analysis and found to contain the following products.

TABLE II

| Product: | Weight percent |
|---|---|
| Hexamethyleneimine (B.P. 138° C.) | 12.20 |
| Hexamethylenediamine (B.P. 205° C.) | 80.70 |
| 2-ethylpyrrolidine (B.P. 122–123° C.) | 1.75 |
| 2-pipecoline (B.P. 117° C.) | 3.85 |
| 2,5-dimethylpyrrolidine (B.P. 106° C). | 1.20 |
| Others | 0.30 |

As each of the cyclic products boils substantially lower than the hexamethylenediamine, separation by fractional distillation was easily effected for isolation of the desired hexamethylenediamine after treatment with caustic to free the amines. Obviously, however, the separation may also be carried out by steam distillation.

The following examples were carried out to illustrate that, in fact, cyclization of the dibromohexane impurities did occur during amination of the mixture of products as in Example II.

EXAMPLE III

Crude 1,5-dibromohexane (474 grams) was obtained in a two-step synthesis employing the well-known Schotten-Baumann benzoylation of 2-pipecoline by the use of benzoyl chloride and the von Braun bromination of the resulting cyclic amide by use of phosphorous pentabromide. Analysis of the crude product showed 37.8% 1,5-dibromohexane, 8.9% 1,4-dibromohexane, 17.7% light ends and 35.7% heavy ends. Vacuum distillation of the crude mixture yielded 161 grams of 1,5-dibromohexane of which 83.7 grams was 95% pure with 0.4% of 1,4-dibromohexane and 4.6% light ends as impurities.

48 grams of the 1,5-dibromohexane (0.197 mole) of 95% purity was then charged to a 1-liter autoclave. The autoclave was heated to 80° C. and 331 grams of ammonia was added. The temperature dropped to 46° C. whereupon the autoclave was reheated to 77° C., then stirred for 4 hours, during which period the temperature dropped to 35° C. The autoclave was then vented and the ammonia removed under vacuum by use of a water aspirator. On opening the autoclave, 52.5 grams of solid was removed and dissolved in a mixture of 15.8 grams of sodium hydroxide, 55.8 grams of water and 541.7 grams of n-propanol.

Analysis of a sample of the resulting solution showed that 75.2 grams of 2-pipecoline was present (78% of the theoretical yield). No heavy components were present which would correspond to 1,5-diaminohexane.

On distillation of the solution to a pot temperature of 130° C. and an overhead temperature of 102° C., the 2-pipecoline (B.P. 117°–119° C.) was distilled as an azeotrope with the water and n-propanol. Analysis of the resulting distillate showed that it contained 2.2 weight percent (13.5 grams) of 2-pipecoline.

EXAMPLE IV 62.7 grams of distilled 2,5-dibromohexane of 97.3% purity was charged to a 1-liter autoclave and heated to 80° C. whereupon 461 grams of ammonia was added. After the addition, the temperature dropped to 46° C. and the autoclave was reheated to 83° C. Thereafter, the autoclave was stirred for 2.5 hours while cooling to near room temperature. The autoclave was then vented and the residual ammonia removed by vacuum with a water aspirator. On opening the autoclave, 60.3 grams of solid was recovered which was dissolved in 21 grams of sodium hydroxide, 73.7 grams of water and 634 grams of n-propanol. Gas chromatographic analysis of a sample of the solution showed that 99 percent of the product was 2,5-dimethylpyrrolidine with a heavier component corresponding to 2,5-diaminohexane being present in an amount of 1 percent.

It is obvious that many variations of the invention will occur to those skilled in the art. For example, mixtures of dihalogenated products for amination may be recovered from processes other than specifically set forth above.

What is claimed is:

1. A process for producing pure hexamethylenediamine which comprises reacting a mixture comprising 1,6-dihalohexane 1,4-dihalohexane, 1,5-dihalohexane and 2,5-dihalohexane, where in the halogen atom is selected from the group consisting of bromine, chlorine and iodine, with ammonia under ammonolysis conditions to form hexamethylenediamine from the 1,6-dihalohexane, and the cyclic amines, 2-ethylpyrrolidine, 2-pipecoline and 2,5-dimethylpyrrolidine from the 1,4-dihalohexane, 1,5-dihalohexane and 2,5-dihalohexane, respectively, and distilling the product mixture to separate the hexamethylenediamine from the cyclic amines.

2. A process according to claim 1 wherein the hexane mixture is obtained by the hydrobromination of 1,5-hexadiene.

3. A process according to claim 1 wherein the amine products are distilled by fractional distillation.

4. A process according to claim 1 wherein the amine products are distilled by steam distillation.

5. A process according to claim 1 wherein the ammonolysis reaction is conducted by contacting the dihalohexane mixture with ammonia at about ambient temperature and a pressure from about atmospheric up to about 1000 p.s.i.g.

6. A process according to claim 5 wherein the ammonia is anhydrous liquid ammonia.

References Cited

UNITED STATES PATENTS 2,078,582  4/1937  Nafash.

CHARLES B. PARKER, *Primary Examiner.*

R. L. RAYMOND, *Assistant Examiner.*

U.S. Cl. X.R.

260—293. 326.8